United States Patent
Iwamoto et al.

(10) Patent No.: US 11,264,937 B2
(45) Date of Patent: Mar. 1, 2022

(54) AC ROTARY MACHINE APPARATUS

(71) Applicant: Mitsubishi Electric Corporation, Tokyo (JP)

(72) Inventors: Naoyuki Iwamoto, Hyogo (JP); Akitoshi Takaya, Hyogo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 0 days.

(21) Appl. No.: 16/975,191

(22) PCT Filed: Apr. 6, 2018

(86) PCT No.: PCT/JP2018/014748
§ 371 (c)(1),
(2) Date: Aug. 24, 2020

(87) PCT Pub. No.: WO2019/193749
PCT Pub. Date: Oct. 10, 2019

(65) Prior Publication Data
US 2020/0395883 A1    Dec. 17, 2020

(51) Int. Cl.
H02P 1/54    (2006.01)
H02P 5/00    (2016.01)
H02P 29/66    (2016.01)
H02P 25/22    (2006.01)

(52) U.S. Cl.
CPC ............ H02P 29/66 (2016.02); H02P 25/22 (2013.01)

(58) Field of Classification Search
CPC ................................ H02P 29/66; H02P 25/22
USPC ......................................................... 318/34
See application file for complete search history.

(56) References Cited

U.S. PATENT DOCUMENTS

| | | | |
|---|---|---|---|
| 2002/0116100 A1* | 8/2002 | Shimazaki | B60L 50/60 701/22 |
| 2006/0091836 A1 | 5/2006 | Oyobe et al. | |
| 2011/0095717 A1* | 4/2011 | Takizawa | B60L 3/0061 318/473 |
| 2013/0033210 A1* | 2/2013 | Suzuki | B62D 5/0403 318/400.22 |
| 2015/0188479 A1* | 7/2015 | Asai | H02P 25/22 318/400.13 |

(Continued)

FOREIGN PATENT DOCUMENTS

| | | |
|---|---|---|
| JP | 2004-364352 A | 12/2004 |
| JP | 2006-136096 A | 5/2006 |

(Continued)

OTHER PUBLICATIONS

International search report for PCT/JP2018/014748 dated Jul. 3, 2018.

*Primary Examiner* — Erick D Glass
(74) *Attorney, Agent, or Firm* — Sughrue Mion, PLLC; Richard C. Turner (57) ABSTRACT

With the object of preventing deterioration due to the temperature when charging a secondary battery, a configuration is such that currents are controlled so as to be caused to flow equally through the respective phases of three-phase coils of a second group which configure an AC rotary machine body, whereby a large current is caused to flow for a short time, causing the secondary battery to rise in temperature, even when the AC rotary machine body is in a state of rest.

4 Claims, 5 Drawing Sheets

(56) References Cited

U.S. PATENT DOCUMENTS

2016/0118923 A1* 4/2016 Kano ............... H02K 3/28
                                                318/400.02

FOREIGN PATENT DOCUMENTS

JP         2018-57161 A    4/2018
WO     2014/024490 A1   2/2014

* cited by examiner

AC ROTARY MACHINE APPARATUS

CROSS-REFERENCE TO RELATED APPLICATIONS

This application is a National Stage of International Application No. PCT/JP2018/014748 filed Apr. 6, 2018.

TECHNICAL FIELD

The present application relates to the field of an AC rotary machine apparatus which includes a secondary battery.

BACKGROUND ART

In recent years, a secondary battery is in widespread use as a power source for motorized equipment such as a hybrid vehicle or an electric vehicle, and for example, a hybrid vehicle is configured so that when a motor runs the vehicle, the motor is driven by a current from a secondary battery, and on the other hand, that when power output from an engine is high, a generator is driven by the engine, charging the secondary battery. It is known that the degree of deterioration of the secondary battery differs depending on the temperature when charging, and therefore, a technology is known whereby the secondary battery self-generates heat by being charged/discharged, causing the secondary battery to rise in temperature, thus suppressing the deterioration.

As a temperature rise control device for thus causing the secondary battery to rise in temperature, one is proposed which includes a heat generation control section which causes a secondary battery to self-generate heat by discharging the secondary battery, in the mode in which a motor does not rotate, and supplying power to the motor from the secondary battery (for example, refer to PTL 1).

CITATION LIST

Patent Literature

PTL 1: WO 2014/024490

SUMMARY OF INVENTION

Technical Problem

In the heretofore described kind of temperature rise control device, U-phase, V-phase, and W-phase current command values Iu, Iv, and Iw wherein the rotary torque is 0 are calculated from the rotational position of the motor, and the motor is driven based on the current command values, thereby discharging the secondary battery and causing it to self-generate heat.

In the temperature rise control device, however, it is conceivable that a current focused disproportionately on a specific phase continues to flow by causing the motor not to rotate, and a bias occurs in heat generation of the switching elements and coils of the individual phases, so that there is a problem in that a large current cannot be caused to flow for a short time. Also, attention is focused only on self-heat generation of the secondary battery, and no consideration is given about increasing the efficiency of rotation by raising the temperature of the motor.

The present application has been made to solve the above problem, and an object of the present application is to provide an AC rotary machine apparatus which can cause a large current to flow for a short time.

Solution to Problem

An AC rotary machine apparatus disclosed in the present application includes an AC rotary machine body which has a magneto rotor and has first three-phase coils and second three-phase coils for generating rotating magnetic fields in the rotor; a secondary battery which supplies power to the first and second three-phase coils; and a power conversion device which converts direct current generated by the secondary battery to alternating currents, wherein the rotary torque of the AC rotary machine body is controlled by controlling the alternating current generated by the power conversion device, and the apparatus is characterized in that the power conversion device, including a temperature sensor provided on the AC rotary machine apparatus, is configured so that when it is determined, based on temperature information of the temperature sensor, to need a rise in temperature, three-phase alternating currents which are of the same magnitude as and different in phase by 180 degrees from those of the U-phase, V-phase, and W-phase of the first three-phase coils are respectively supplied to the X-phase, Y-phase, and Z-phase of the second three-phase coils in the AC rotary machine body.

Advantageous Effects of Invention

According to the AC rotary machine apparatus disclosed in the present application, current is caused to flow evenly through the respective phases of the three-phase coils configuring the AC rotary machine body, thereby enabling a large current to flow for a short time although the AC rotary machine body is at rest, so that it can be utilized for causing the secondary battery and the AC rotary machine body to rise in temperature. Also, it is possible to realize by using the current control when driving the AC rotary machine body, so that there is no need to provide a temperature rise control circuit outside, and it is thus possible to provide an inexpensive AC rotary machine apparatus.

DESCRIPTION OF EMBODIMENTS

First Embodiment

Hereinafter, a description will be given, based on the drawings, of the first embodiment.

Figure 1:
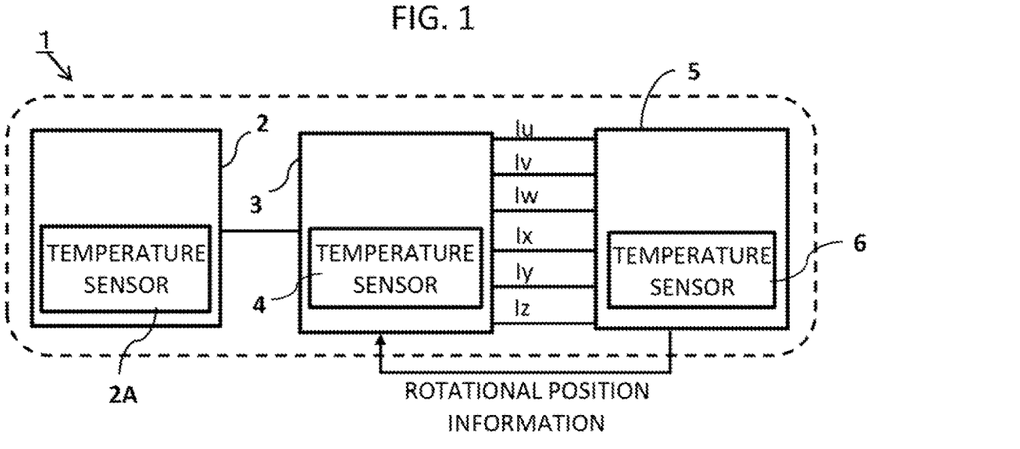
FIG. 1 is a block diagram conceptually showing the configuration of an AC rotary machine apparatus according to the first embodiment.

FIG. 1 is a block diagram conceptually showing the configuration of an AC rotary machine apparatus according to the first embodiment.

In FIG. 1, an AC rotary machine apparatus 1 is configured including a secondary battery 2 which outputs a voltage of the order of 48V, a temperature sensor 2A which detects the temperature of the secondary battery 2, an inverter 3 which has current supplied thereto by the secondary battery 2 and converts the direct current to alternating currents, a temperature sensor 4 which detects the temperature of the inverter 3, a motor 5 which, being an AC rotary machine body, is driven by the inverter 3 to generate power, and a temperature sensor 6 which detects the temperature of the motor 5. Also, the motor 5 is provided with a sensor which detects rotational position information, and the rotational position information, together with the temperature information of the temperature sensor 6, is supplied to the inverter 3.

Next, a description will be given, based on FIG. 2, of the details of the relation of connection between the inverter 3 and the motor 5 in this kind of AC rotary machine apparatus 1.

Figure 2:
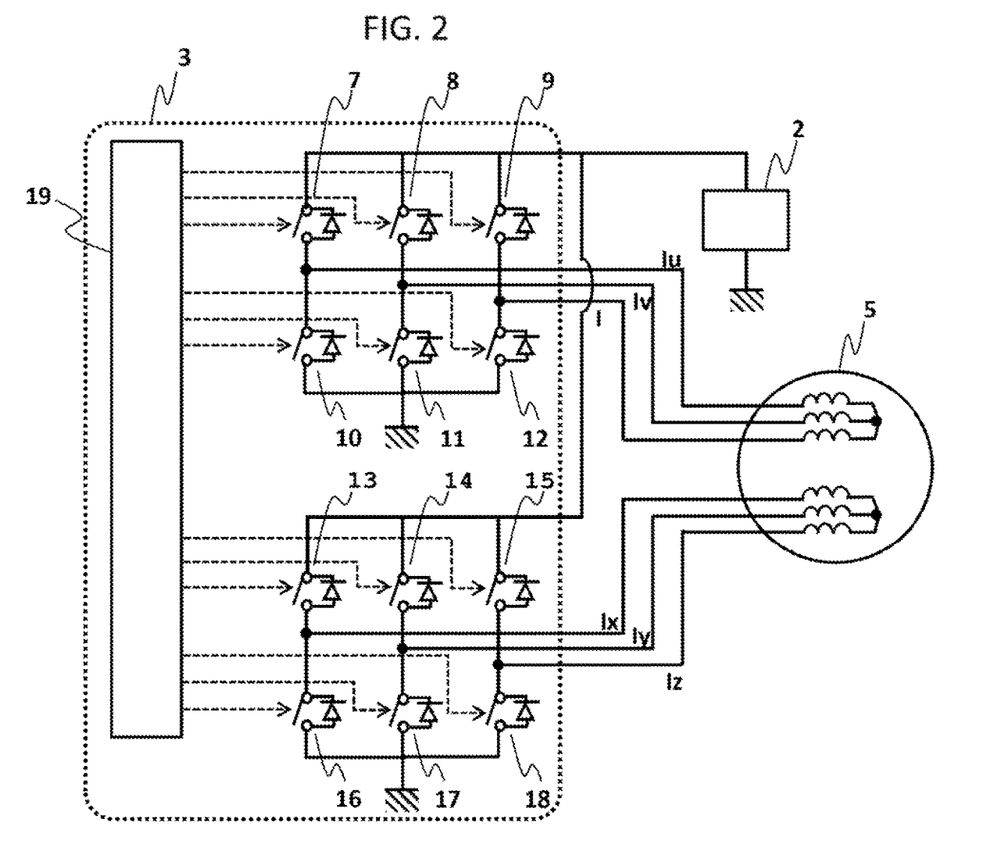
FIG. 2 is a circuit diagram showing the details of the relation of connection between an inverter and a motor in FIG. 1.

In FIG. 2, the inverter 3 includes six upper arm switching elements 7, 8, 9, 13, 14, 15, lower arm switching elements 10, 11, 12, 16, 17, 18, and a microcomputer 19 which controls on/off operations of the switching elements 7 to 18, wherein the currents are supplied to the coils of the motor 5 based on the operations of the switching elements 7 to 18.

That is, when the direct current is supplied by discharging of the secondary battery 2, the switching elements 7 to 18 operate in accordance with instructions of the microcomputer 19, convert the direct current to two groups of three-phase alternating currents Iu, Iv, Iw, Ix, Iy, Iz, and supply them to the coils of the motor 5.

Figure 3:
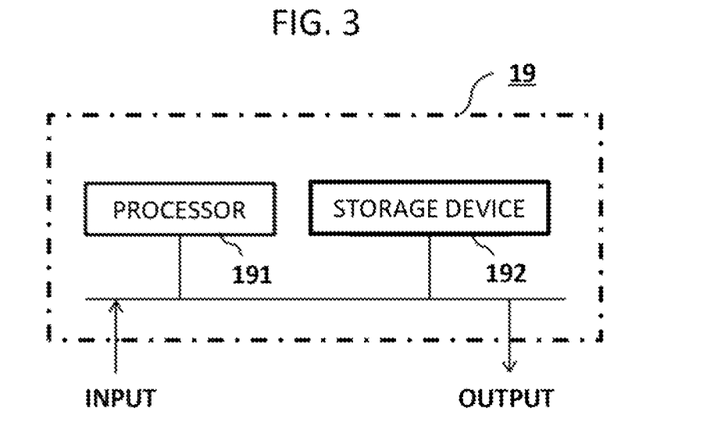
FIG. 3 is a block diagram showing hardware for describing the main portion configuration of the inverter.

The microcomputer 19 is configured of a processor 191 and a storage device 192, as one example of hardware is shown in FIG. 3. The storage device 192, although the details are not shown, includes a volatile storage device, such as a random access memory, and a non-volatile auxiliary storage device, such as a flash memory, and the processor 191 executes a program inputted from the storage device 192. In this case, the program is inputted into the processor 191 from the auxiliary storage device via the volatile storage device. Also, the processor 191 may output data, such as a result of calculation, to the volatile storage device of the storage device 192, or may store the data into the auxiliary storage device via the volatile storage device. Furthermore, the storage device 192 may include an auxiliary storage device which is a hard disk instead of a flash memory.

Figure 4:
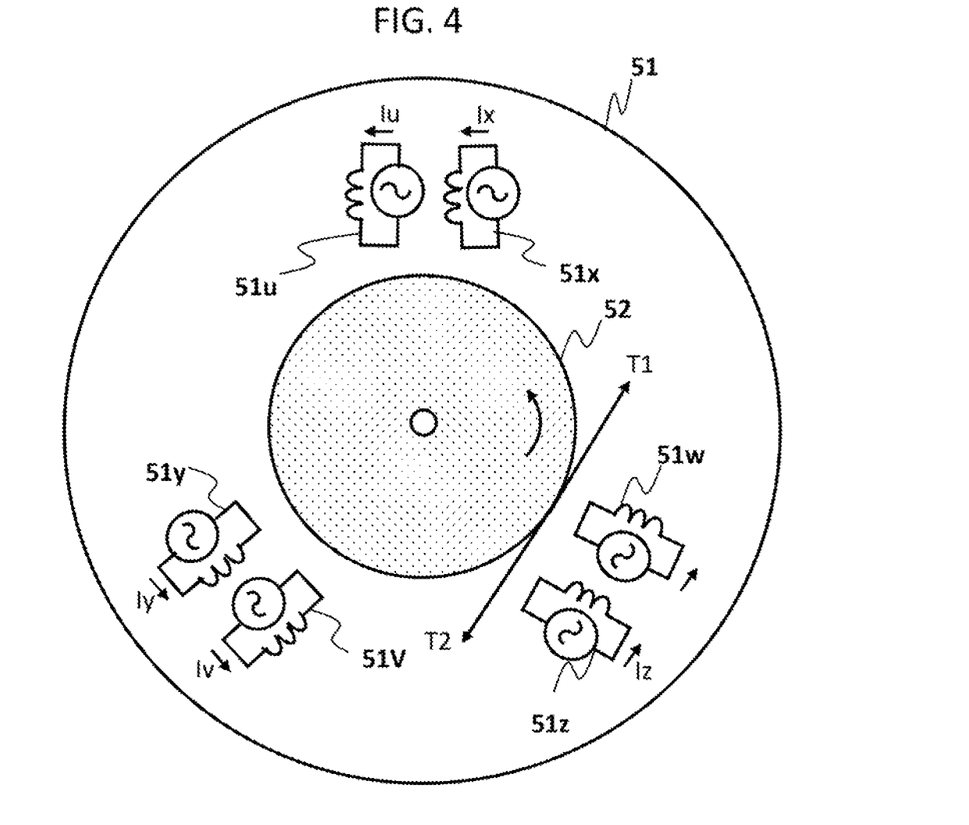
FIG. 4 is an outline view showing the configuration of an AC rotary machine body shown in FIG. 2.

On the other hand, the motor 5, as shown in FIG. 4, is configured of a stator 51 which has disposed thereon six coils 51u, 51v, 51w, 51x, 51y, 51z for generating magnetic fields and a magneto rotor 52 which is disposed in the center as opposed to the stator 51. Here, the coils are combined in pairs, 51u and 51x, 51v and 51y, and 51w and 51z, and the paired coils are disposed around the rotor 52 at 120-degree intervals centered on the rotor 52.

Consequently, the inverter 3 is configured so that the phase difference between the three-phase alternating currents (U-phase current Iu, V-phase current Iv, W-phase current Iw) of a first group, out of the two groups of three-phase alternating currents to be outputted, is set to 120 degrees, while the phase difference between the three-phase alternating currents (X-phase current Ix, Y-phase current Iy, Z-phase current Iz) of a second group is also set to 120 degrees, and furthermore, that the current Iu and the current Ix, the current Iv and the current Iy, and the current Iw and the current Iz are controlled so as to be outputted at a phase difference of 0 degrees between each pair of currents, causing the three-phase alternating currents Iu, Iv, Iw, Ix, Iy, Iz of the two groups to flow through the respective six coils 51u, 51v, 51w, 51x, 51y, 51z in the motor 5. This generates an equivalent magnetic field in the U-, V-, W-phases and the X-, Y-, Z-phases, forming a torque which causes the rotor 52 to rotate.

Figure 5:
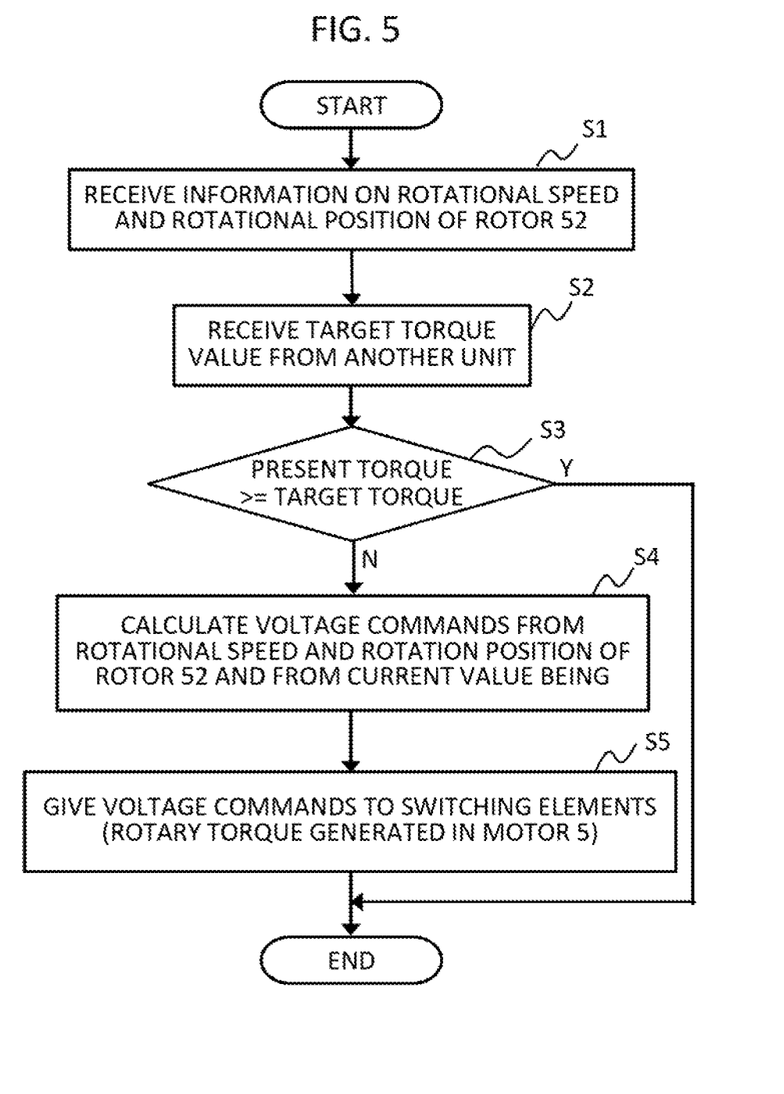
FIG. 5 is a flowchart for describing the processing of the inverter when in motor drive control in the first embodiment.

FIG. 5 is a flowchart showing the processing of the inverter 3 when in motor drive control.

In the drawing, first, the inverter 3 receives the rotational speed information and rotational position information of the rotor 52, from the motor 5, based on the program stored in the storage device 192 of the microcomputer 19 (Step S1). Also, the inverter 3 receives a targeted torque value, which causes the motor 5 to rotate, from another unit (Step S2).

Next, it is determined whether the present torque value has reached the targeted torque value (Step S3), and when the present torque value has reached the targeted torque value (Y), the processing flow is finished directly.

On the other hand, when it is determined in Step S3 that the present torque value has not reached the targeted torque value (N), the processing flow proceeds to Step S4, wherein voltage command values are calculated from the rotational speed information and rotational position information of the rotor 52 and from the values of three-phase alternating currents which are supplied to the motor 5 at present (Step S4). After that, the calculated voltage command values are given to the switching elements 7 to 18, controlling the currents (Step S5), and the motor 5 is caused to generate a rotary torque and carry out its normal drive control.

Next, a description will be given, using FIGS. 6 and 7, of the operation when the motor 5 is driven without being caused to generate the rotary torque, causing the secondary battery 2 and the motor 5 to rise in temperature.

Figure 6:
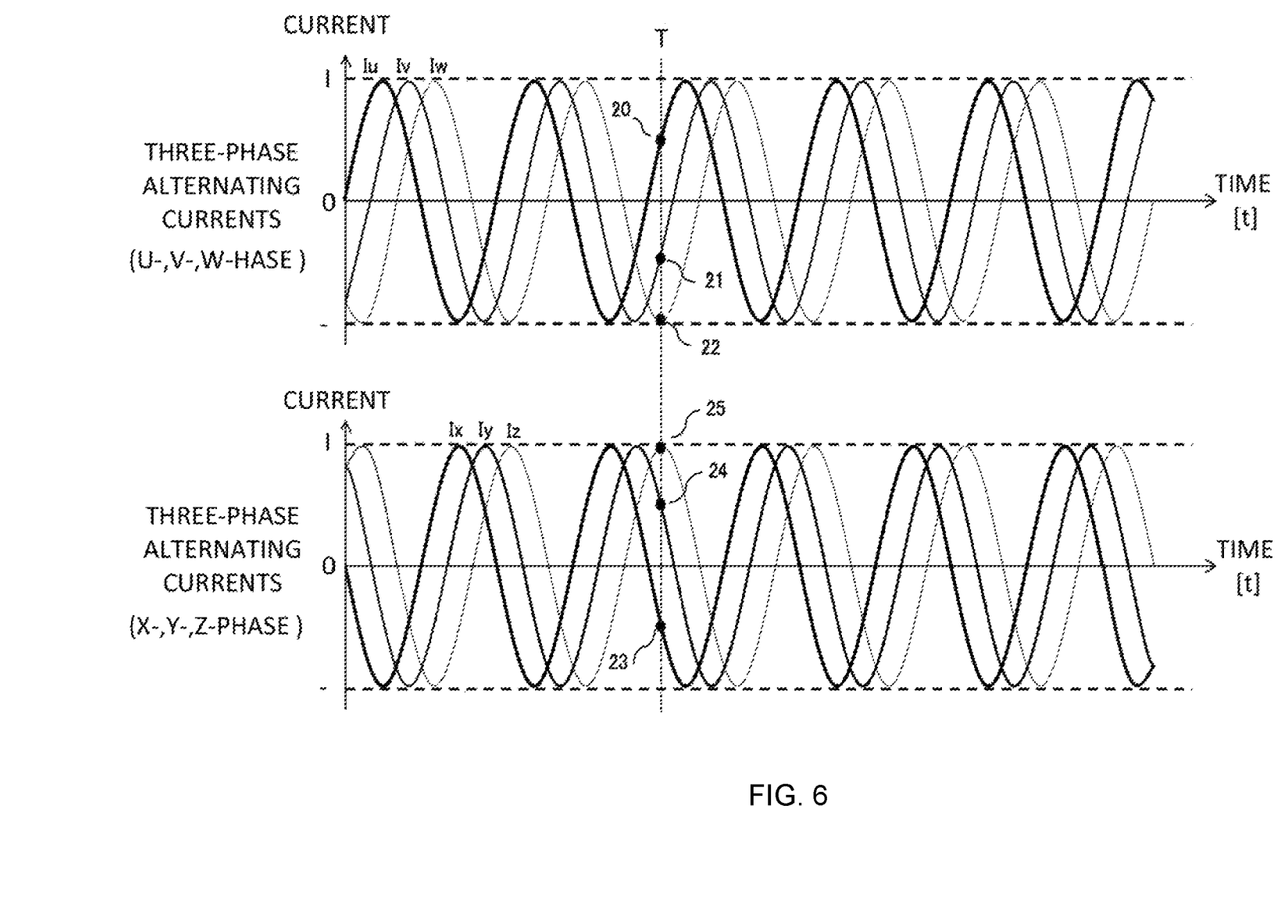
FIG. 6 is a characteristic diagram showing waveforms of three-phase alternating currents under temperature rise control in the first embodiment.

FIG. 6 shows waveforms representing alternating currents caused to flow through the two groups of three-phase coils 51u, 51v, 51w, 51x, 51y, 51z in the motor 5.

In the drawing, the first group of three-phase alternating currents (U-phase, V-phase, W-phase) is formed of the U-phase current Iu, the V-phase current Iv, and the W-phase current Iw, and the second group of three-phase alternating currents (X-phase, Y-phase, Z-phase) is formed of the X-phase current Ix, the Y-phase current Iy, and the Z-phase current Iz. Here, the V-phase current Iv, the W-phase current Iw, the Y-phase current Iy, and the Z-phase current Iz are formed so as to be 120 degrees later in phase than the U-phase current Iu, the V-phase current Iv, the X-phase current Ix, and the Y-phase current Iy, respectively. Also, the X-phase current Ix, the Y-phase current Iy, and the Z-phase current Iz are made later by a phase difference of 180 degrees than the U-phase current Iu, the V-phase current Iv, and the W-phase current Iw, respectively. Also, the amplitudes of the currents are all taken as I[A].

For example, at a time point T, a U-phase current 20, a V-phase current 21, and a W-phase current 22 have the same amplitude as and a current value opposite in sign to an X-phase current 23, a Y-phase current 24, and a Z-phase current 25, respectively, and this remains the same at any time point.

Figure 7:
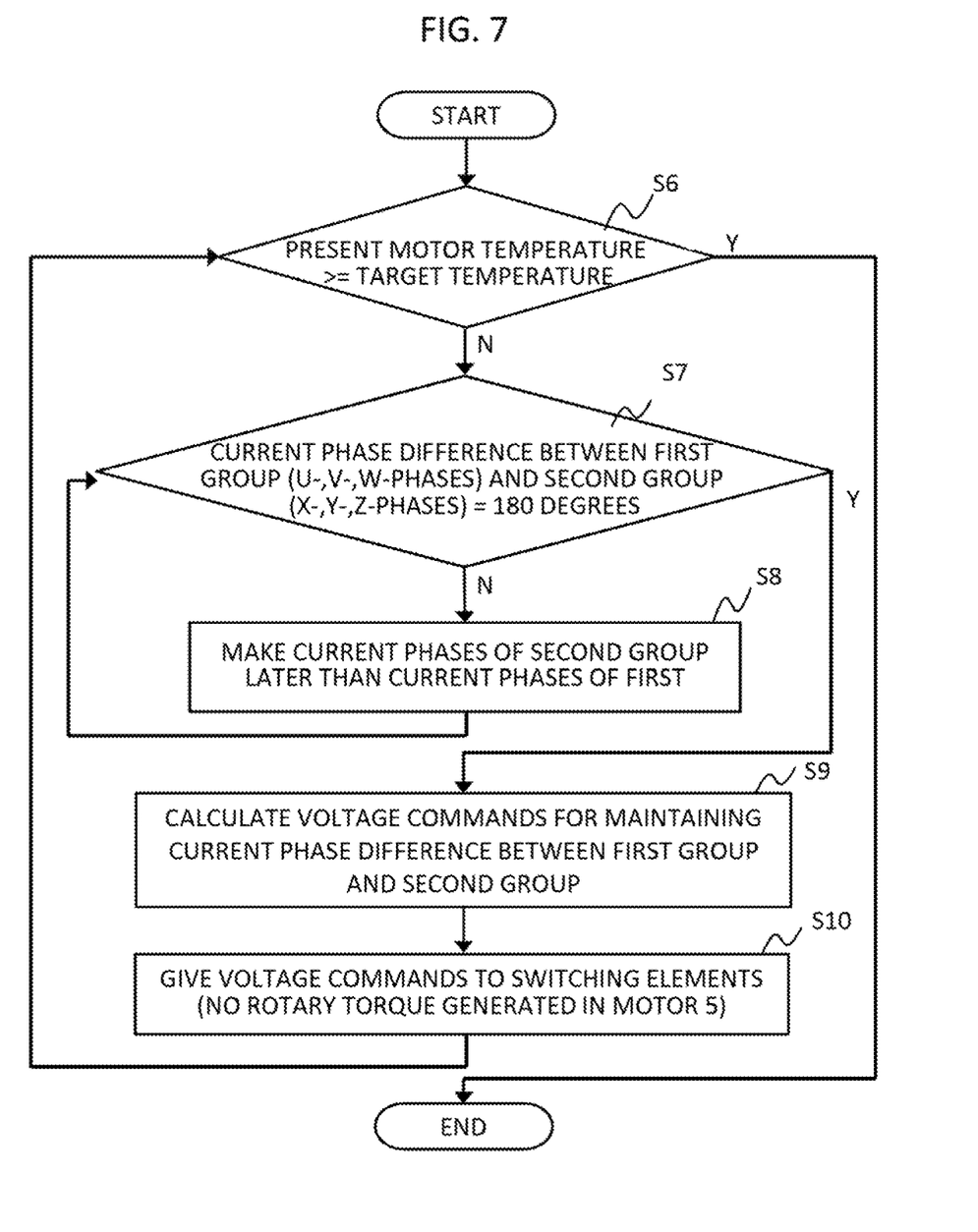
FIG. 7 is a flowchart for describing the processing of the inverter when in temperature rise control in the first embodiment.

FIG. 7 is a flowchart for describing the above kind of inverter processing when under temperature rise control in the first embodiment, and in the drawing, first, it is determined by the temperature sensor 6 of the motor 5 whether the present motor temperature has reached a target temperature (Step S6), and when the present motor temperature has reached the target temperature (Y), it means that there is no need for the temperature rise control, and the flow is finished. The temperature of the secondary battery 2, although being detectable by the temperature sensor 2A, is substantially equal to the temperature of the motor 5, so that the temperature sensor 6 of the motor 5 can be substituted for the temperature sensor 2A. Also, the target temperature is pre-set to a kind of value at which no deterioration occurs by charging of the secondary battery 2, for example, to 0[° C.] which is the common lower operating temperature limit of a lithium-ion battery.

Next, when the present motor temperature has not reached the target temperature (N), the flow moves to Step S7, wherein it is determined whether the current phase difference between the first group (U-phase, V-phase, W-phase) and the second group (X-phrase, Y-phase, Z-phase) is 180 degrees. Here, when the current phase difference is not 180 degrees (N), the flow moves to Step S8, wherein the currents of the second group (X-phase, Y-phase, Z-phase) are delayed, and the operation of the inverter 3 is repeated until the phase difference reaches 180 degrees.

Next, when the current phase difference between the first group (U-phase, V-phase, W-phase) and the second group (X-phase, Y-phase, Z-phase) reaches 180 degrees, the flow moves to Step S9, wherein current command values are calculated such as to maintain the current phase difference therebetween, and the calculated current command values are given to the respective switching elements 7 to 18, causing the motor 5 to operate (Step S10).

At this time, when the rotary torque generated by the U-phase current 20, V-phase current 21, and W-phase current 22 in FIG. 6 is taken as T1 in FIG. 4, the rotary torque generated by the X-phase current 23, Y-phase current 24, and Z-phase current 25 is what is shown by T2 in FIG. 4, and T1 and T2 are the rotary torques of the same magnitude and of opposite directions.

Consequently, the rotary torques of the motor 5 generated by the coils 51u, 51v, 51w, 51x, 51y, 51z can be regarded as substantially zero.

As a result, the motor 5 does not rotate, but a discharge current flows from the secondary battery 2 to the inverter 3, so that the secondary battery 2 rises in temperature due to self-heat generation.

Also, at this time, currents are supplied to the six coils 51u, 51v, 51w, 51x, 51y, 51z of the individual phases from the inverter 3, but as the motor 5 does not rotate, a torque loss occurs, and the coils 51u, 51v, 51w, 51x, 51y, 51z of the motor 5 generate heat.

When the above kind of operation finishes, the flow returns from Step S10 to Step S6 at a predetermined timing, and subsequently the flow is repeatedly executed until the present temperature reaches the target temperature.

Here, the currents flowing through the coils 51u, 51v, 51w, 51x, 51y, 51z of the individual phases are all of a current value within the amplitude I[A], so that the currents do not ever flow while focusing disproportionately on a specific phase. Consequently, the amplitude I[A] is increased, thereby enabling a large current to flow equally for a short time, and it is possible to efficiently cause the secondary battery 2 and the motor 5 to rise in temperature.

Also, the control when driving the motor 5 can be used for the control to cause currents different in phase to flow through the coils 51u, 51v, 51w, 51x, 51y, 51z of the individual phases, so that there is no need to provide an external circuit for the temperature rise control, and there is an advantage in that it is thus possible to provide an inexpensive AC rotary machine apparatus.

Furthermore, the motor 5 can be caused to rise in temperature without being rotary driven, so that this is useful for starting of the AC rotary machine apparatus in cold climates.

Still furthermore, it is possible to measure the temperature with the temperature sensor 4 provided on the inverter 3 and to cause current to flow through the AC rotary machine body 5 until the temperature reaches the targeted temperature.

The temperature sensor 2A, the temperature sensor 4, and the temperature sensor 6, instead of being installed on the secondary battery 2, the inverter 3, or the motor 5, are installed on another portion of the AC rotary machine apparatus 1, thereby also enabling a configuration such as to cause the temperature of the secondary battery 2 to be estimated.

Although the present application is described above in terms of an exemplary embodiment, it should be understood that the various features, aspects, and functionality described in the embodiment are not limited in their applicability to the particular embodiment with which they are described, but instead can be applied, alone or in various combinations, to the embodiment.

It is therefore understood that numerous modifications which have not been exemplified can be devised without departing from the scope of the present application. For example, at least one of the constituent components may be modified, added, or eliminated.

REFERENCE SIGNS LIST

1: AC rotary machine apparatus
2: secondary battery
2A: temperature sensor
3: inverter (power conversion device)
4: temperature sensor
5: motor (AC rotary machine body)
51: stator
51u•51v•51w: U-phase, V-phase, W-phase coils
51x•51y•51z: X-phase, Y-phase, Z-phase coils
52: rotor
6: temperature sensor
7•8•9•10•11•12: U-phase, V-phase, W-phase switching elements
13•14•15•16•17•18: X-phase, W-phase, Z-phase switching elements
19: microcomputer

The invention claimed is:

1. An AC rotary machine apparatus, comprising:
a temperature sensor;
an AC rotary machine body which has a magneto rotor and has first three-phase coils and second three-phase coils for generating rotating magnetic fields in the magneto rotor;
a battery which supplies power to the first three-phase coils and the second three-phase coils; and
a power conversion device which converts direct current generated by the battery to alternating currents,
wherein a rotary torque of the AC rotary machine body is controlled by controlling the alternating currents generated by the power conversion device, and
wherein, based on identifying that temperature information of the temperature sensor indicates to execute an increase in a temperature of the AC rotary machine body, the power conversion device is configured to operate so that three-phase alternating currents which are of the same magnitude as and different in phase by 180 degrees from those of U-phase, V-phase, and W-phase of the first three-phase coils are respectively supplied to X-phase, Y-phase, and Z-phase of the second three-phase coils in the AC rotary machine body, to increase the temperature of the AC rotary machine body.

2. The AC rotary machine apparatus according to claim 1, wherein the U-phase, V-phase, and W-phase of the first three-phase coils and the X-phase, Y-phase, and Z-phase of the second three-phase coils in the AC rotary machine body are disposed around the magneto rotor with a phase difference of 120 degrees between the U-, V-, and W-phases and between the X-, Y-, and Z-phases, and wherein each of the phase difference between the U-phase and the X-phase, the phase difference between the V-phase and the Y-phase, and the phase difference between the W-phase and the Z-phase is set to 0 degrees.

3. The AC rotary machine apparatus according to claim 1, wherein the temperature sensor is mounted on the AC rotary machine body, the secondary battery, or the power conversion device.

4. The AC rotary machine apparatus according to claim 2, wherein the temperature sensor is mounted on the AC rotary machine body, the battery, or the power conversion device.

\* \* \* \* \*